United States Patent [19]

Fukuda et al.

[11] Patent Number: 5,273,843
[45] Date of Patent: Dec. 28, 1993

[54] NON-AQUEOUS INORGANIC ELECTROLYTE CELL

[75] Inventors: Hiroshi Fukuda, Suita; Shigeo Kobayashi, Yawata; Kenichi Morigaki, Nishinomiya; Syuichi Nishino, Hirakata; Tomokazu Mitamura, Neyagawa, all of Japan

[73] Assignee: Matsushita Electric Industrial Co., Ltd., Osaka, Japan

[21] Appl. No.: 611,116

[22] Filed: Nov. 9, 1990

[30] Foreign Application Priority Data

Nov. 15, 1989 [JP] Japan .................................. 1-296526
May 10, 1990 [JP] Japan .................................. 2-120253

[51] Int. Cl.⁵ .............................................. H01M 2/14
[52] U.S. Cl. .................................. 429/101; 429/251; 429/252; 429/254
[58] Field of Search ................. 429/101, 251, 252, 254

[56] References Cited

U.S. PATENT DOCUMENTS

| | | | |
|---|---|---|---|
| 3,985,573 | 11/1976 | Johnson et al. | 429/133 |
| 4,221,346 | 9/1980 | Armstrong et al. | |
| 4,421,834 | 12/1983 | Zupancic | 429/196 |
| 4,806,439 | 2/1989 | Wessling et al. | 429/50 |

FOREIGN PATENT DOCUMENTS

| | | |
|---|---|---|
| 0296589 | 12/1988 | European Pat. Off. |
| 0384572 | 8/1990 | European Pat. Off. |
| 59-14260 | 1/1984 | Japan |
| 0006052 | 5/1985 | Japan |
| 60-136161 | 7/1985 | Japan |
| 61-16465 | 1/1986 | Japan |
| 62-254357 | 11/1987 | Japan |
| 63-187555 | 8/1988 | Japan |
| 2-66851 | 3/1990 | Japan |
| 2109255 | 4/1990 | Japan |
| 2-170347 | 7/1990 | Japan |

Primary Examiner—Robert Kunemund
Assistant Examiner—C. Everhart
Attorney, Agent, or Firm—Stevens, Davis, Miller & Mosher

[57] ABSTRACT

The present invention relates to a separator and spacer for use in non-aqueous inorganic electrolyte cells using oxyhalides as both a solvent and cathode active material, and an alkali metal as anode active material. There is provided a non-aqueous inorganic electrolyte cell which has a good discharge performance, preservability, and a safety to resist the charging at 5 V caused due to erroneous operations and accidents, by specifying a content of glass involved in the separator made of mainly glass fibers, specifying the type of synthetic resin of other components than glass fibers, or by specifying an oxyhalide absorbance of materials from which the separator and the spacer are produced.

5 Claims, 3 Drawing Sheets

NON-AQUEOUS INORGANIC ELECTROLYTE CELL

BACKGROUND OF THE INVENTION

1. Field of the Invention

The present invention relates to a non-aqueous inorganic electrolyte cell using oxyhalides as solvents for the electrolyte and active cathode materials, and using alkali metals as active anode materials. More particularly, the present invention relates to provision of a non-aqueous inorganic electrolyte which is not affected by charging at a voltage as high as 5 V as caused due to erroneous operations or accidents and which has a good discharging performance.

2. Description of the Related Art

Recently, non-aqueous inorganic electrolyte cells using oxyhalides such as thionyl chloride and the like as solvents for electrolytes and active cathode materials, and using alkali metals as active anode materials have been received particular attention as having a discharge voltage not less than 3 V, a higher energy density, and excellent characteristics at lower temperatures as compared with other non-aqueous electrolyte cells.

FIG. 1 is a cross-sectional view of a typical non-aqueous inorganic electrolyte cell using an oxyhalide as a solvent for electrolyte and an active cathode material. Referring to the Figure, the reference number 1 is an anode of lithium, 2 is a separator of non-woven glass fiber fabrics, and 3 is a porous cathode of carbon such as artificial graphite or carbon black. 4 is a cathode collector, and 5 is a cell container made of stainless steel and also acting as an anode collector. 6 is a sealing plate made of stainless steel, the perimeter of which is welded onto the opening of the cell container 5. Inside the central hole of the sealing plate 6 is formed a glass seal 7, through which a metal pipe 9 has been disposed and welded thereto. After injecting an electrolyte through the metal pipe 9, a cathode collector 4 is inserted through the pipe into the porous cathode 3 along the central axis thereof. The cathode collector 4 and the metal pipe 9 are welded to each other to seal the inside of cell. An example of electrolytes to be used in this type of cell is, for example, a mixture of thionyl chloride containing 1.5 mol/l of CiAlCl$_4$ dissolved therein, which thionyl chloride functions concurrently as cathode active material. 10 is an upper spacer composed of the similar materials to those of the separator, and 8 is a space in the cell where free thionyl chloride is present. 12 is a bottom spacer.

In the above structure, the separator 2 will have an insufficient mechanical strength if it is made of glass fibers alone. Therefore, a binder such as polyvinyl alcohols, polyvinyl acetates, polyvinyl chlorides, acrylic resins, or other synthetic resins should be used therewith, as disclosed in Japanese Patent KOKAI (Laid-open) Nos. Sho 59-14260 and 61-16465.

A content of the binder should be in a minimum amount sufficient to impart a mechanical strength to the separator. If the content is too high, the uniform distribution of electrolyte is prevented, the electric resistance of the separator is increased, and a reaction of the binder with oxyhalides during storage is caused to evolve hydrogen chloride and the like, which will result in an increase in the pressure within the cell and deterioration of the discharging performance thereof, as reported in the art. In this regard, for example, Japanese Patent KOKAI (Laid-open) No. Sho 59-14260 describes the use of a separator having a content of glass of 85 to 95% by weight, and Japanese Patent KOKAI (Laid-open) No. Sho 62-254357 describes the use of a separator containing no binder.

In the above structure, the thionyl chloride containing CiAlCl$_4$ is present in the porous cathode 3, separator 2, and the spacer 10 as impregnated therewith, and further on the spacer as liberated thionyl chloride 11. The thionyl chloride impregnated in the porous cathode 3 is consumed with discharge so that the thionyl chloride existing in other parts must be transferred to the porous cathode 3 in order to allow continuous discharging. Moreover, the thionyl chloride containing LiAlCl$_4$ acts also as electrolyte. Therefore, the velocity of migration of the thionyl chloride containing LiAlCl$_4$ in the separator and the spacer has a great influence on the discharging capacity and the characteristics under a high load of the cell.

An extensive study has been made on the relationship between the separator or the spacer and the discharge characteristics and preservability, as described above.

On the other hand, the liquid thionyl chloride used in the aforementioned arrangement is highly volatile and corrosive, and harmful to health. For the reason, the cells have been sealed by welding with laser beam. In another aspect, however, it is this complete sealing to provide a risk of blast or explosion of the cells due to erroneous operations such as charging and short circuit. This type of cell has been widely used in memory backup circuits, in which it is connected in parallel with a 5 V power supply with a diode being disposed in series therebetween for the purpose of preventing charging. Notwithstanding, there has been a high risk of the explosion when the diode is broken down from any possible causes.

As measures of imparting a safety against charging to the separator or spacer, the aforementioned Japanese Patent KOKAI (Laid-open) No. Sho 59-14260 requires glass fibers having a specific diameter and length and a specified content of glass. As to the separator having a glass content in a lower range, however, any study on the safety to resist charging has not been made into details yet by those skilled in the art including us.

As to the migration velocity of the thionyl chloride in the separator and spacer, we have already proposed for improvement in discharge characteristics of the cells standing upside down that the separator should be projected partly into the space so as to contact the electrolyte therein, and that the separator having a water absorbance of 20 mm/10 minutes as measured according to the JIS standard 2111 should be used. The results of research show that there is always no close relationship between the water absorbance and the thionyl chloride absorbance. For example, a low water absorbance does not always mean giving a low thionyl chloride absorbance, like the case where the thionyl chloride absorbance was 9.5 mm/10 minutes, or where the thionyl chloride absorbance was 23.0 mm/10 minutes where the water absorbance was 7.5 mm/10 minutes. Furthermore, it has been found that there occurs such a problem of safety as mentioned above, when the thionyl chloride absorbance is too high.

SUMMARY OF THE INVENTION

In order to ensure the safety to resist the charging at 5 V owing to erroneous operations and accidents, and to provide a non-aqueous inorganic electrolyte cell having a higher discharging capacity and a better preservability, a research has been made to both material qualities and physical properties of the separator and the spacer. As a result, the present invention contemplates disposing a separator or spacer comprising not less than 50% by weight but less than 85% by weight of glass, and the balance being a synthetic resin based on the total weight of the separator or spacer. With respect to physical properties, at least one of the separator or spacer is made with a material having an absorbance of not less than 7.0 mm/10 minutes but not higher than 20.0 mm/10 minutes as measured in accordance with the absorbance determining procedure defined in JIS standard C 2111 except that it is modified by substituting an oxyhalide for water.

With regard to the determining procedure, JIS standard C 2111 states that "Three specimens of dimensions of about 15 by 200 mm are cut from a sheet along the longitudinal direction and transverse direction thereof, they are vertically hung separately with the lower end being immersed into distilled water or ion-exchanged water at a temperature of 20°±5° C. to a depth of 3 mm. After 10 minutes, a height of the most advanced level of the absorbed water on each of the specimens from the surface of the water is determined as an absorbance in terms of mm to obtain an average of the three."

The reasons why both measures taken by the present invention are effective have not been fully known yet. It may be presumed with regard to the material aspect, however, that when the separator contains a higher amount of synthetic resin, the synthetic resin or a reaction product of the synthetic resin and the oxyhalide melt due to elevation of temperature upon charging, so that the liquid-permeability of the separator itself is reduced and the flow of the electrolyte passing through the anode and the porous cathode is blocked.

When the temperature reaches the melting point of the anode active material, alkali metals, the molten alkal metals passes through the separator to reach the porous cathode where the cathode and anode active materials in the highly reactive liquid state are brought to react on each other causing the worst thermal runaway. It is desired, therefore, that such a synthetic resin as being capable of surely melting before the temperature inside of the cell reaches such level due to an increase in the temperature upon charging is contained in the separator. However, if the content of the synthetic resin is too high, the synthetic resin comes to react gradually on an oxyhalide during an extended preservation period which may cause a reduction in discharging capacity. Therefore, it is necessary to specify the upper and lower limits of the glass content.

The following consideration may be given with respect to the physical properties. It has been believed that, for example, the thionyl chloride/lithium cell is safe to resist charging because the charging generates chlorine gas and $SOCl^+$ at the cathode and lithium at the anode, and then the chlorine gas and the lithium react on each other to produce LiCl which reacts further with $SOCl^+$ returning to thionyl chloride and lithium ion as having been originally present. However, when the separator is made of a material having a thionyl chloride absorbance in excess of 20.0 mm/10 minutes, a rate of supplying the thionyl chloride to the porous cathode may be so high that a rate of the chlorine gas generation becomes higher than that of the aforementioned returning reaction to cause blast of the cell. Conversely, when the separator is made of a material having a thionyl chloride absorbance not higher than 7.0 mm/10 minutes, a rate of supplying the thionyl chloride to the porous cathode may be lower than that of the chlorine gas generation, which may deplete the liquor in the porous cathode to block a flow of electric current while proceeding the aforementioned returning reaction, thereby ensuring the security of the cell.

The consideration on the safety to resist the charging as above can apply not only to the separator but also to the spacer differing from the consideration on the material aspect. It is preferred, of course, that both the separator and the spacer are made of the material.

DETAILED DESCRIPTION OF PREFERRED EMBODIMENTS

The present invention will be explained with reference to Examples hereunder.

Figure 1:
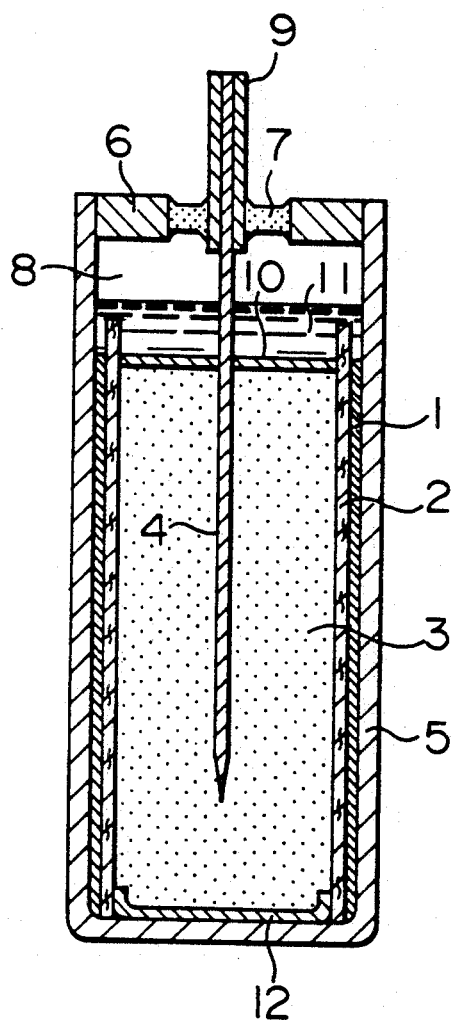
FIG. 1 shows a cross-sectional view of a structure of a typical non-aqueous electrolyte cell.

The present cell has a similar basic arrangement to that shown in FIG. 1. The following explanation is made referring to a practical cell having a size AA (50.0 mm in height, 14.5 mm in diameter). An anode 1 of lithium of 0.8 mm thick×37 mm high×37 mm wide is attached under pressure onto the inside wall of a cell container 5. A porous cathode 3 is formed from a mixture comprising acetylene black containing polytetrafluoroethylene (PTFE) as a binder in an amount of 10% by weight based on the total weight of the formed body, and has a porosity of about 80% and outside dimensions of 30 mm in height and 10 mm in diameter. The opening of the cell container 5 of stainless steel has a sealing plate 6 disposed in contact with the inside wall thereof, through a central hole of which plate a metal pipe 9 of stainless steel is fixed with a glass seal 7 being filled in the space between the plate and the pipe. The perimeters of the opening of the cell container 5 and the sealing plate 6 are welded to each other by irradiating with laser beam. 4 cc of thionyl chloride containing 1.5 mol/l of $LiAlCl_4$ acting as both an electrolyte and cathode active material is injected into the inside through the metal pipe 9. The cathode collector 4 acts as both a cathode collector and a plug. The top portion of the metal pipe 9 is welded to that of the cathode collector 4 by irradiating with laser beam. The separator 2 disposed between the anode 1 and the porous cathode 3, the upper spacer 10 disposed on the porous cathode, and the bottom spacer 12 disposed under the porous cathode 3 are all composed of non-woven glass fiber-based fabrics.

EXAMPLE 1

Separator 2 has a content of glass of 50% by weight in Example a, and 84% by weight in Example B.

In addition, as Comparative Examples, identical cells were made at the same time, except that the separator had a content of glass of 45% by weight in Comparative Example a, and 90% by weight in Comparative Example b.

In Examples A and B, and Comparative Examples a and b, the binder contained in the separators were composed of a polyester and an acrylic resin at a compound ratio of polyester/acrylic resin of 4:3. Most of the acrylic resins melt at a temperature of 150° to 160° C. or lower, while lithium has a melting point of 186° C. It may be presumed, therefore, that the acrylic resins melt before lithium does to cause plugging the liquid-permeating pores of the separator.

Twenty cells were fabricated for each case according to Examples A and B, and Comparative Examples a and b, 10 of which were tested for the safety at 5 V charging, 5 of which were for the continuous discharging under a 300 Ω constant load after preserved at a temperature of 60° C. for 100 days.

The test for the safety to resist the charging at 5 V yielded the following results:

| Example A | 0 | Comparative Example | 0 |
| Example B | 0 | Comparative Example | 80 |

Figure 2:
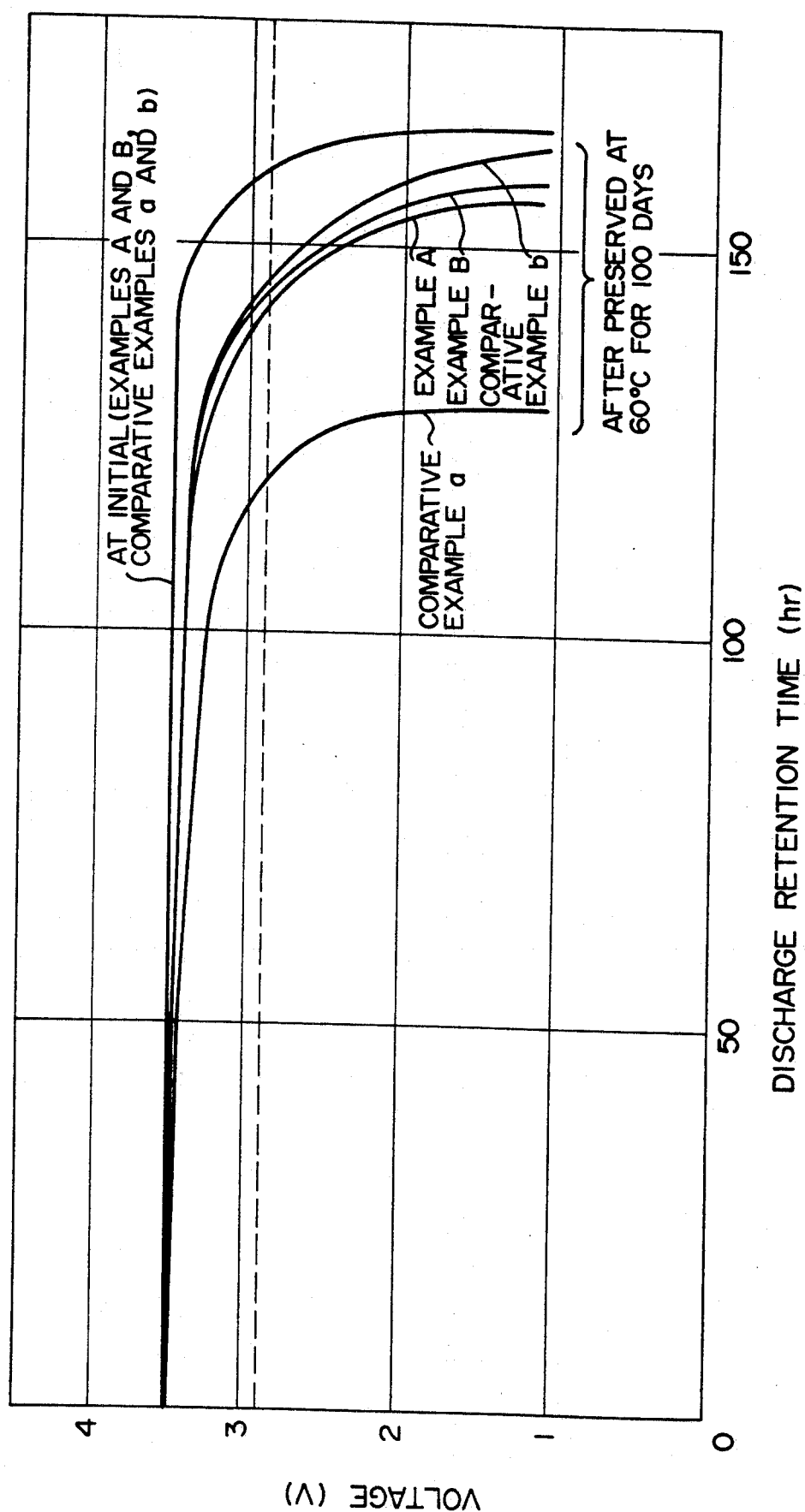
FIG. 2 shows curves of the discharging voltage under a 300 Ω load as a function of the discharge retention time for the cells of Examples A and B according to the present invention and those of Comparative Examples a and b at an initial time and after preserved at 60° C. for 100 days.

Representative results of the test for the continuous discharging under a 300 Ω constant load after preserved at a temperature of 60° C. for 100 days are shown in FIG. 2 together with discharging curves obtained just before preservation.

All the cells of Examples A and B according to the present invention, and those of Comparative Examples a and b before the preservation thereof exhibited the identical discharging curves over a discharge retention time of about 160 hours till a terminating voltage of 2.9 V. After preserved at a temperature of 60° C. for 100 days, however, the discharge retention times were 142, 144, and 145 hours for Examples A, B, and Comparative Example b, respectively, while 120 hours for Comparative Example a with a rate of remaining discharge capacity reduced to about 75%.

Comparing with the present invention, the cells with a separator containing a higher amount of glass had an insufficient safety to resist charging, and a higher possibility of the risk of blasting and explosion (Comparative Example b). Whereas the cells with a separator containing a reduced amount of glass as less than 85% by weight glass and a correspondingly higher amount of binder as in Examples A and B and Comparative Example a and a higher safety to resist charging.

On the other hand, the cells with a separator having a glass content less than 50% by weight had a poor preservability as shown in Comparative Example a.

As can be seen from the foregoing, there could be obtained non-aqueous inorganic electrolyte cells having a separator made of non-woven glass fiber-based fabrics which are safe to resist the charging at a voltage of 5 V caused by erroneous operations or accidents by using such a separator as having a glass content of not less than 50% by weight but less than 85% by weight.

Although thionyl chloride was illustrated as oxyhalide in the present Examples, phosphoryl chloride and sulfuryl chloride may be used instead. Furthermore, the alkali metal employed was lithium, though sodium and potassium may be used. The porous cathode employed had a cylindrical configuration, but not limited thereto, other configurations such as a spiralled sheet may be used.

EXAMPLE 2

Separators and spacers were made using 5 sorts of non-woven glass fiber fabrics having an absorbance of 5.0, 7.0, 10.0, 20.0, and 23.0 mm/10 minutes as measured in accordance with the absorbance determining procedure defined in JIS standard C 2111 except that it is modified by substituting thionyl chloride for water, and the cells for Examples and Comparative Examples were fabricated using combinations of the separators and the spacers as indicated in the following table.

The separators and spacers were prepared with the absorbance above being changed by changing the clogged state of the glass fibers (apparent density) and the kind, proportion and content of the binder and combinations thereof. For example, the separator and the spacer of Example A were prepared from 50 wt % of glass fibers with an apparent density of 0.28 g/cm³, 22 wt % of an acrylic resin as a binder and 28 wt % of a polyester resin as another binder.

| Combinations for examples and Comparative Examples (mm/10 mins.) | | |
|---|---|---|
| | Separator | Spacer |
| Example A | 10.0 | 10.0 |
| Example C | 7.0 | 7.0 |
| Example D | 20.0 | 20.0 |
| Example E | 20.0 | 23.0 |
| Example F | 7.0 | 5.0 |
| Comparative Example c | 5.0 | 5.0 |
| Comparative Example d | 23.0 | 23.0 |

Thirty cells were fabricated for each case according to Examples A, C to F, and Comparative Examples c and d using the combinations as shown in the above table, 10 of which were tested for the safety to resist the charging at 5 V, and 10 of which were for the continuous discharging under a 120 Ω load after aging at room temperature for 20 days.

The test for the safety to resist the 5 V charging yielded the results as follows:

| Proportion of the cells blasted or exploded (%) | | | |
|---|---|---|---|
| Example A | 0 | Comparative Example c | 0 |
| Example C | 0 | Comparative Example d | 80 |
| Example D | 0 | | |
| Example F | 0 | | |

Figure 3:
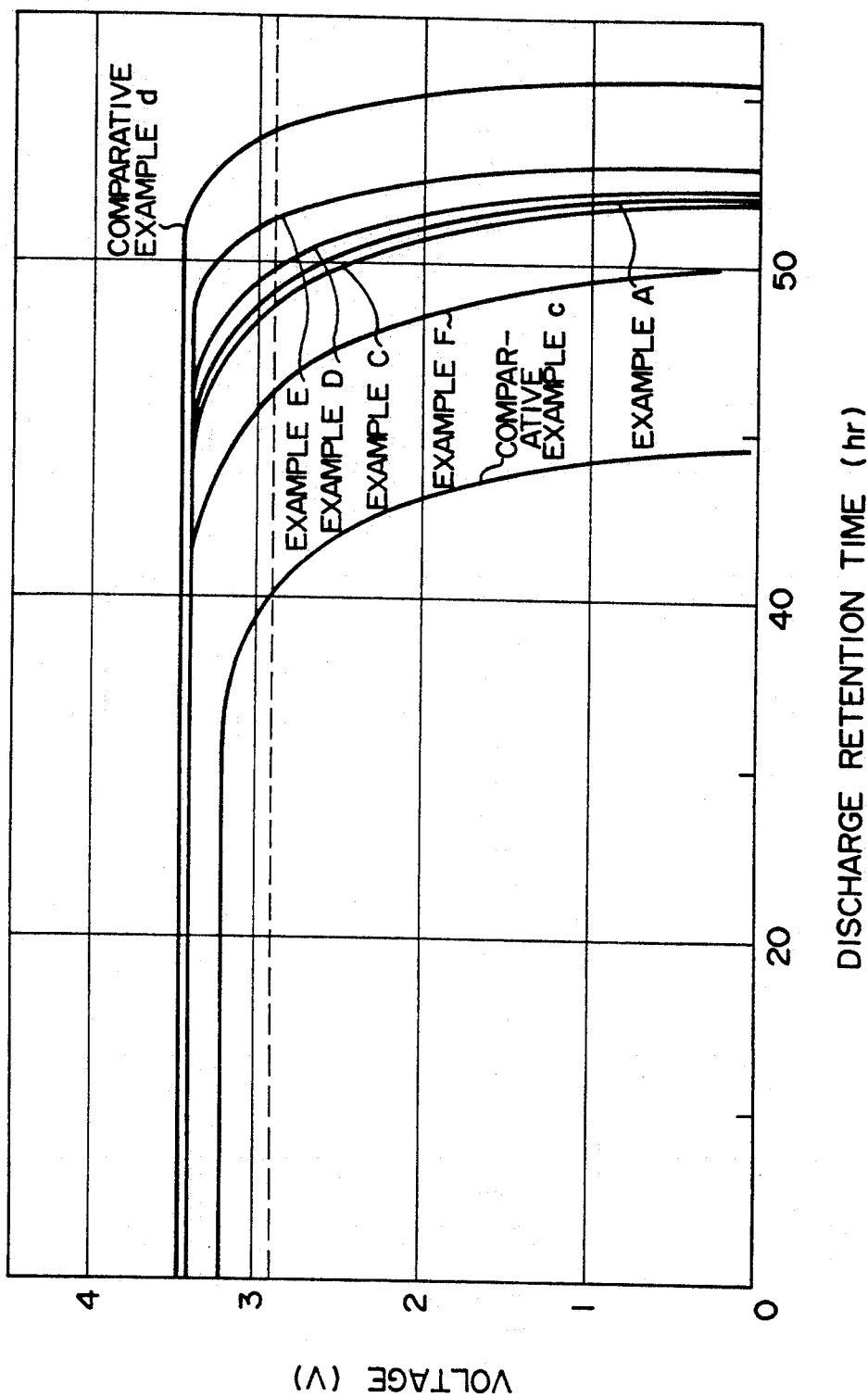
FIG. 3 shows curves of the discharging voltage under a 120 Ω load as a function of the discharge retention time for the cells of Examples C to F according to the present invention and those of Comparative Examples c and d.

Representative results of the test for the continuous discharging under a 120 Ω constant load performed for the cells of Examples and Comparative Examples are shown in FIG. 3.

The cells of Examples A, C to F according to the present invention retained a voltage of about 3.4 V over a discharge retention time of 55 to 63 hours till a terminating voltage of 2.9 V.

In contrast, Comparative Example c exhibited a retained voltage as low as 3.2 V, and a discharge retention time of 41 hours, i.e., only about 75% of the discharge retention time of Example F.

Comparing with the present invention, the cells with a separator being too high in the thionyl chloride absorbance had an insufficient safety to resist charging, and a higher possibility of the risk of blasting and explosion (Comparative Example d). Whereas the cells with a separator or spacer or both having a thionyl chloride absorbance of not higher than 20.0 mm/10 minutes had a higher safety to resist charging.

On the other hand, the cells with a separator and spacer having a thionyl chloride absorbance of not higher than 7.0 mm/10 minutes exhibited poor discharge properties under a high load as shown in Comparative Example c.

This is considered owing to the inhibition of diffusion of thionyl chloride and LiAlCl$_4$ by the separator and the spacer. In the case of Comparative Example d, the cells exhibited an outstanding performance, a discharge retention time 68 hours, but they had a problem on the safety to resist charging as described above.

As can be seen from the foregoing, there could be obtained non-aqueous inorganic electrolyte cells which are safe to resist the charging at a voltage of 5 V caused by erroneous operations or accidents, and have a good discharge performance, by using such separator and spacer as having an absorbance of not less than 7.0 mm/10 minutes but not higher than 20.0 mm/10 minutes as measured in accordance with the absorbance determining procedure defined in JIS standard C 2111 except that it is modified by substituting thionyl chloride for water.

Although thionyl chloride was illustrated as an oxyhalide in the present Examples, phosphoryl chloride and sulfuryl chloride may be used. Furthermore, the alkali metal employed was lithium, though sodium and potassium may be used. The porous cathode employed had a cylindrical configuration, but not limited thereto, other configurations such as a spiralled sheet may be used.

What is claimed is:

1. A non-aqueous inorganic electrolyte cell comprising a porous cathode made of carbon, a solvent for electrolyte and a cathode active material consisting of an oxyhalide, an anode active material of an alkali metal, and a separator made mainly of glass fibers, in which said separator comprises not less than 50% by weight but less than 85% by weight of glass fibers based on the total weight of the separator, the balance being a synthetic resin.

2. The non-aqueous inorganic electrolyte cell according to claim 1, in which said synthetic resin contained in the separator contains a material which can melt at a lower temperature than that of said alkali metal as the anode active material.

3. The non-aqueous inorganic electrolyte cell according to claim 1, in which said synthetic resin is an acrylic resin and/or a polyester resin.

4. The non-aqueous inorganic electrolyte cell according to claim 1, in which said oxyhalide is one or more of thionyl chloride, phosphoryl chloride and sulfuryl chloride.

5. The non-aqueous inorganic electrolyte cell according to claim 1, in which said porous cathode is in the form of a bobbin or a spiralled sheet.

* * * * *